Patented Apr. 13, 1954

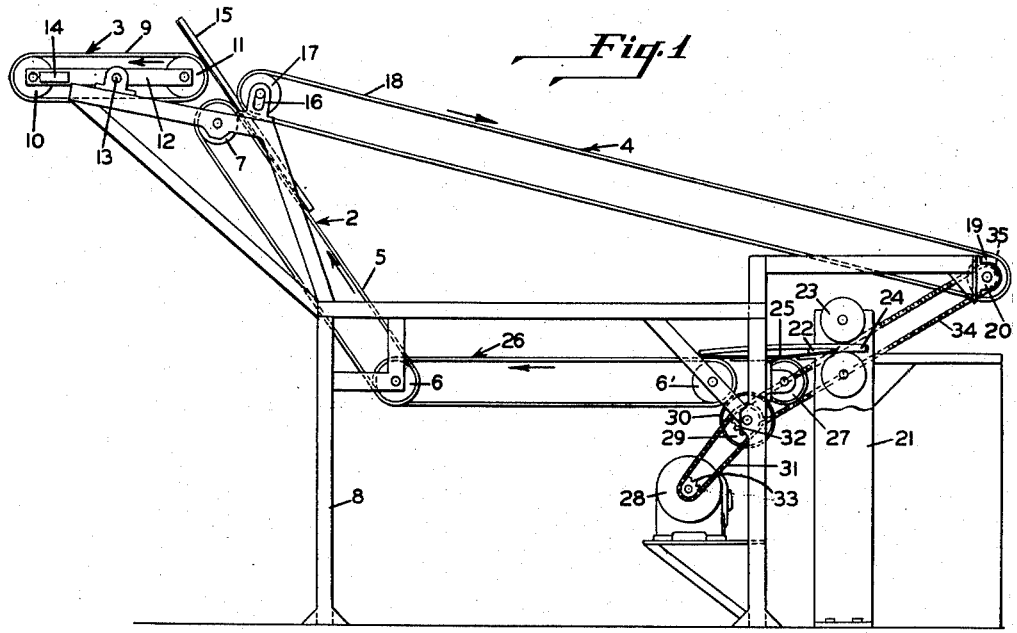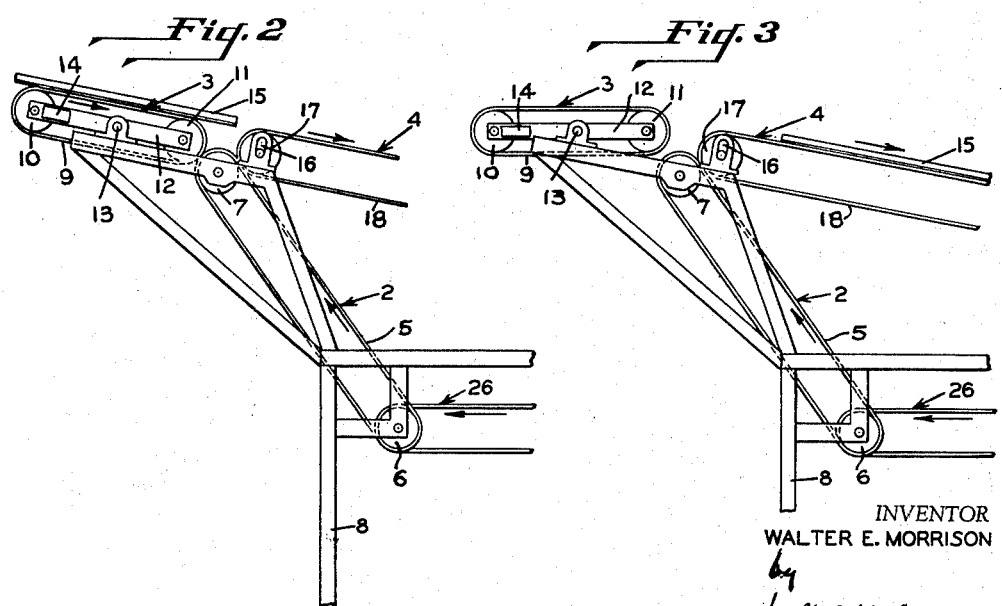

2,675,118

UNITED STATES PATENT OFFICE 2,675,118

SELF-ACTUATING RETURN CONVEYER SYSTEM

Walter E. Morrison, Braintree, Mass., assignor to Armstrong Cork Company, Lancaster, Pa., a corporation of Pennsylvania Application August 2, 1952, Serial No. 302,370

4 Claims. (Cl. 198—27)

1

This invention relates to a self-actuating return conveyor system and is particularly concerned with a system for conveying articles, such as pieces of cork and rubber or the like, from a machine such as a so-called leather splitter or a sander and for returning the articles to a position where an operator may refeed the articles to the splitter for further severance or to a sander where the operator may upon reversing the position of the sheet sand the opposite side. The invention will be useful in many other operations where redelivery of the article to an operator or directly to a machine is desired.

It is an object of the invention to provide a conveyor system which will automatically elevate an article above a fabricating machine and return it to the operating station at the machine.

A further object of the invention is to provide a conveyor system of the type mentioned above which will accommodate articles of varying thicknesses such as mats of cork and rubber compositions from which sheets are severed and thus the thickness of the mats progressively decreased.

An additional object of the invention is to provide a conveyor system of the type mentioned above including a simple driving arrangement effective for providing the desired motions to one or more of the conveyor elements.

According to the present invention, there is provided an inclined conveyor section which elevates the article and delivers it to a pivoted conveyor section which is disposed adjacent to the inclined conveyor section. The pivoted conveyor section is normally biased to an inoperative position to permit the article being conveyed to move substantially unrestrictedly beyond the inclined conveyor section and thus fall upon the pivoted conveyor section, the weight of the article being adequate to overcome the bias applied to the pivoted conveyor section, and the same thereupon moving to an operative position to deliver the article to a return conveyor section. The pivoted conveyor preferably is freely rotatable so that the article being conveyed by the inclined conveyor and coming into engagement with the pivoted conveyor may move without substantial obstruction by imparting movement to the pivoted conveyor through frictional contact between the article being conveyed by the inclined conveyor and the surface of the pivoted conveyor, such as a belt or the like. When the pivoted conveyor moves to its operative position it is preferably driven in a direction to deliver the article disposed thereon to the return conveyor section disposed above the inclined conveyor and adjacent to the pivoted conveyor. This driving of the pivoted conveyor may be effected by having the surface of the pivoted conveyor belt, if a belt be employed, come into engagement with the surface of the inclined conveyor which is driven.

In order that the invention may be readily understood, a preferred embodiment of the invention will be described in conjunction with the attached drawing, in which:

Figure 1 is a diagrammatic side elevational view showing a typical self-actuating return conveyor system embodying the principles of the present invention;

Figure 2 is a partial view in diagrammatic form similar to Figure 1 illustrating the position assumed by the conveyor sections upon delivery of an article to the pivoted conveyor section; and Figure 3 is a view similar to Figure 2 showing the position assumed by the conveyor sections upon delivery of the article from the pivoted conveyor section of Figure 2 onto the return conveyor section.

In the embodiment illustrated, the system comprises an inclined conveyor 2, a pivoted conveyor 3, and a return conveyor 4. These are illustrated as belt conveyors in the drawing. Conveyor 2 which is shown as a "take-away" conveyor is preferably made up of a number of narrow belts 5 disposed over sheaves 6 and 7 which are journalled in bearings secured to the framework 8 of the machine. A single belt 9 of pivoted conveyor 3 is trained over sheaves 10 and 11 which are journalled in a supporting frame 12 which is pivoted as indicated at 13 to an angle-braced extension of frame 8. The pivoted conveyor 3 is biased to an inoperative position, preferably in a generally horizontal plane, as shown in Figures 1 and 3. This may be effected by providing a counterweight 14 on the conveyor frame 12, adequate to bias the conveyor to the position shown in Figure 1.

Return conveyor 4 may be arranged to cooperate with inclined conveyor 2 to provide a nip therebetween through which articles 15 to be conveyed may be delivered in a positive manner. This is accomplished in the embodiment illustrated, as shown in Figure 1, by providing slotted bearings 16 for the upper sheave 17 for the belt 18 of the return conveyor. The other sheave 19 for the return conveyor is mounted in bearings 20 affixed to the machine frame 8. This permits upward displacement of the return conveyor at the nip upon movement of the articles 15 into the nip between the return conveyor and the inclined conveyor. This permits positive driving of the articles by the conveyors, should that be necessary or desirable.

In the embodiment shown in Figure 1 the conveyor system has been illustrated in association with a splitting machine 21 which has been diagrammatically shown. This includes a splitting band knife 22 and a pair of article-feeding rolls 23 which deliver a mat 24 to be split into engagement with the band knife 22. A sheet 25 is severed from the mat 24, and the sheet and mat are discharged as a unit 15 onto a transfer conveyor 26 which delivers the unit to inclined conveyor 2. An idler supporting roll 27 may be positioned between the splitting machine 21 and the transfer conveyor 26 to support the sheet and mat as they are delivered to the transfer conveyor. This conveyor may take the form of a plurality of relatively narrow belts which are disposed over sheave 6 of the inclined conveyor 2, alternating with the belts 5 of that conveyor, and a second sheave 6' journalled in bearings secured to the framework 8.

Driving of the conveyors 2, 4, and 26 may be effected by a motor and gear reduction unit 28. A driving roll 29 is journalled in bearings in the frame 8 and has a friction surface 30 which engages the belts of the transfer conveyor 26. This roll 29 is driven by a chain 31 trained over a sprocket 32 fixed to the spindle of roll 29 and a sprocket 33 fixed to the output shaft of the reduction unit 28. This effects movement of the transfer conveyor 26 and, through it, the inclined conveyor 2 in the direction of the arrows as shown in Figure 1.

Return conveyor 4 is driven by motor and reduction unit 28 through a chain 34 which encircles a sprocket (not shown) which is fixed for rotation with sprocket 32, and a sprocket 35 attached to the spindle of sheave 19 of the return conveyor 4, causing return conveyor 4 to move in the direction of the arrow shown in Figure 1.

The pivoted conveyor 3 is free for movement in either direction, to the left as viewed in Figure 1 when engaged by the unit 15 which is being fed upwardly between the nip of conveyors 2 and 4, and to the right when overbalanced to the position shown in Figure 2 by the article 15 which rests thereon. This brings belt 9 into engagement with the surface of belts 5 of the inclined conveyor which are driven in the direction of the arrow as shown in Figure 2, and thus conveyor 3 is driven to the right as shown in that view to deliver the article 15 onto the return conveyor 4 for return of the same to an operator standing behind splitter 21 and feeding the mats thereto for severance.

Preferably the various conveyor sections are made up of belts as shown in the drawings, although this is not essential. Also the various sections are preferably driven, but this is not necessary in some instances. For example, the inclined conveyor may be a slat conveyor mounted on chains with appropriate spaced abutments for engagement with the edges of articles to be delivered. The pivoted conveyor may be a live roll or a dead roll conveyor, and the return conveyor conceivably could be in the nature of a metal chute. With a dead roll conveyor for the pivoted section and a chute for the return section, only the inclined section and the transfer conveyor, if one be provided, need be driven.

I claim:

1. A self-actuating return conveyor system comprising a driven upwardly inclined conveyor, a pivoted conveyor disposed beyond said inclined conveyor and normally biased to an inoperative position to provide for travel of an article beyond said inclined conveyor and pivotable from said position to an operative position upon delivery thereto from said inclined conveyor of an article to be conveyed, and a return conveyor disposed above said inclined conveyor to define a nip therebetween through which said article is delivered to said pivoted conveyor, said return conveyor being aligned with said pivoted conveyor for the reception of said article from said pivoted conveyor when the same is in its operative position.

2. A self-actuating return conveyor system comprising a driven belt upwardly inclined conveyor, a driven belt return conveyor, sheaves over which said belts are trained to define a nip therebetween, at least one of said sheaves being journalled in a slotted bearing for movement to alter the spacing between said sheaves defining said nip to accommodate articles of varying thickness for delivery through said nip, and a pivoted conveyor disposed above said nip for the reception of an article delivered through said nip, said pivoted conveyor being pivotally movable from an inoperative position during delivery of an article through said nip to an operative position in alignment with said delivery conveyor upon deposit of said article onto said pivoted conveyor.

3. A self-actuating return conveyor system comprising a driven belt upwardly inclined conveyor, a driven belt return conveyor, the upper reaches of said belts moving in opposite directions, an idling belt pivoted conveyor disposed above said inclined conveyor and movable from an inoperative position to an operative position with the pivoted conveyor in driven engagement with said inclined conveyor belt, and means for counterweighting said pivoted conveyor to an inoperative position for movement from said inoperative position to said operative position upon delivery thereto of an article by said inclined conveyor and for delivery of said article to said return conveyor upon driving motion imparted to said pivoted conveyor by said inclined conveyor belt.

4. A self-actuating return conveyor system comprising a driven take-away conveyor section, a return conveyor section, a pivoted transfer conveyor section disposed beyond said take-away conveyor section and movable from an inoperative idling position to an operative driven position, means for driving said conveyor when the same is in operative position, and means biasing said transfer conveyor section to said inoperative position to provide for travel of an article beyond said take-away conveyor section and onto said transfer conveyor section in its inoperative idling position and upon delivery thereto of said article which overcomes said bias automatically pivotable from said inoperative position to said operative position for driven delivery of said article therefrom to said return conveyor section, said return conveyor section being aligned with said transfer conveyor section when the same is in its operative position for the reception of said article from said transfer conveyor section.

References Cited in the file of this patent

UNITED STATES PATENTS

| Number | Name | Date |
|---|---|---|
| 499,460 | Hooper | June 13, 1893 |
| 1,597,961 | Farkas | Aug. 31, 1926 |
| 2,380,172 | Harber | July 10, 1945 |